(12) United States Patent
Henley et al.

(10) Patent No.: US 7,159,612 B2
(45) Date of Patent: *Jan. 9, 2007

(54) METHOD AND APPARATUS FOR PNEUMATIC REGULATION A HIGH-PRESSURE RESERVE

(75) Inventors: Jason S. Henley, Mesa, AZ (US); Dale Carpenter, 930 N. Portland, Gilbert, AZ (US) 85234

(73) Assignee: Dale Carpenter, Gilbert, AZ (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/883,391

(22) Filed: Jul. 1, 2004

(65) Prior Publication Data

US 2006/0000510 A1    Jan. 5, 2006

Related U.S. Application Data

(63) Continuation-in-part of application No. 10/434,605, filed on May 9, 2003, now Pat. No. 6,983,761.

(51) Int. Cl.
*G05D 16/10* (2006.01)

(52) U.S. Cl. ............... 137/505.25; 251/285; 251/251

(58) Field of Classification Search .......... 137/315.04, 137/505.25, 505.28, 15.19; 251/285, 251
See application file for complete search history.

(56) References Cited

U.S. PATENT DOCUMENTS

| | | | | |
|---|---|---|---|---|
| 824,527 | A | * | 6/1906 | Colina .................. 251/251 |
| 1,666,283 | A | * | 4/1928 | Farley .................. 137/229 |
| 3,437,109 | A | * | 4/1969 | Carlson et al. ......... 137/505.25 |
| 4,543,985 | A | | 10/1985 | Healy et al. |
| 5,381,825 | A | * | 1/1995 | Garraffa ............... 137/505.18 |
| 5,613,483 | A | | 3/1997 | Lukas et al. |
| 5,669,369 | A | | 9/1997 | Scott |
| 5,881,757 | A | | 3/1999 | Kuster et al. |
| 5,899,221 | A | * | 5/1999 | Holt et al. ............ 137/116.5 |
| 6,983,761 | B1 | * | 1/2006 | Henley et al. ......... 137/505.25 |
| 2002/0104524 | A1 | | 8/2002 | Reible |

* cited by examiner

*Primary Examiner*—Stephen M. Hepperle
(74) *Attorney, Agent, or Firm*—Lawrence Letham; Letham Patent Group LLC

(57) ABSTRACT

Methods and apparatus for regulating fluid pressure are described. A fluid regulator with relatively large passages and a high-pressure reserve may improve performance when the regulator is used in a sustained sequence. A smaller area stem piston may make the regulated pressure more independent of the input pressure.

18 Claims, 4 Drawing Sheets

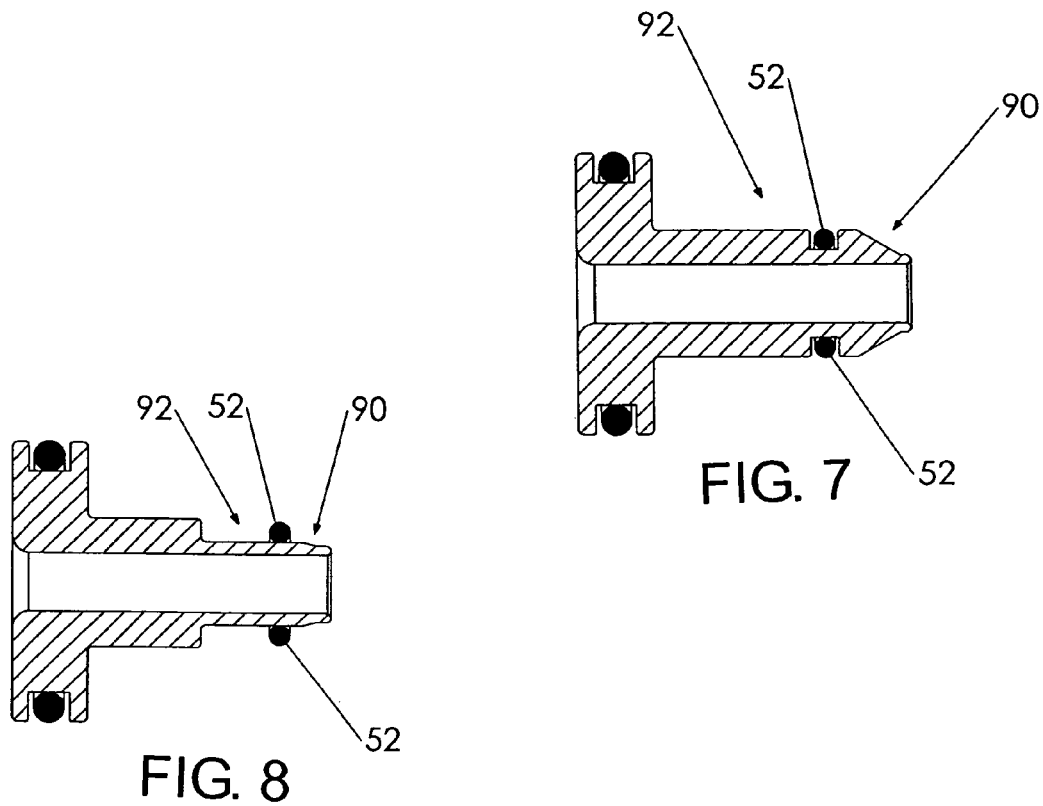
FIG. 7
FIG. 8
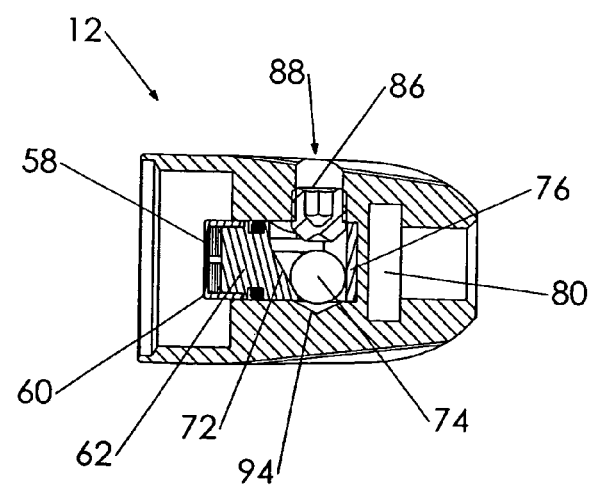
FIG. 9

METHOD AND APPARATUS FOR PNEUMATIC REGULATION A HIGH-PRESSURE RESERVE

CROSS-REFERENCE TO RELATED APPLICATIONS

This application is a continuation-in-part of and claims priority to, and the benefit of, U.S. patent application Ser. No. 10/434,605, filed May 9, 2003 now U.S. Pat. No. 6,983,761, which is hereby incorporated by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention generally relates to pressurized fluid control and regulation valves and more particularly to an air pressure regulator with a high-pressure reserve for use with a paintball marker.

2. Description of Related Art

The sport of paintball is an activity where the participants use air-powered paintball markers to impel frangible balls filled with colored liquid at opposing participants. When the frangible ball, also referred to as a paintball, strikes an opponent, it breaks and releases the contents of the paintball leaving a mark. The air used to impel a paintball, in the typical paintball marker, is normally stored in a bottle at a pressure in the range of approximately 800 to 4,500 psi. The pressured air exits the bottle into a primary regulator that regulates and supplies air in the range of approximately 400 to 1000 psi. The primary regulator remains attached to the bottle and provides a connector to allow the bottle to be refilled. If the paintball marker user does not keep the refill connector covered, dirt can be forced into the connector during use in the field. If the refill connector is not cleaned before refilling the bottle, dirt can be swept into the bottle. It is common for dirt in the air supply to stick to internal seals and to interfere with the movement of internal parts; thereby, causing the paintball marker to malfunction.

The bottle is generally attached to the butt of the paintball marker and provides a secondary function of stabilizing the marker much like the stock of a conventional rifle. The pressured air from the primary regulator pass through a flexible hose, commonly made of plastic or other durable material with an approximate outside diameter of about ¼ inch, to a secondary regulator. Air from the primary regulator enters the secondary regulator, which regulates and supplies air to the paintball marker in the range of approximately 80 to 600 psi. The paintball marker uses the air supplied by the secondary regulator to impel the paintball out of the barrel of the marker. Most secondary regulators threadedly attach to the bottom of the paintball marker a short distance in front of the trigger guard. The position of the secondary regulator enables it to serve as a handgrip to stabilize the paintball marker while in use; however, the location in which the supply hose from the primary regulator attaches to the secondary regulator can limit the secondary regulator's usefulness as a handgrip. If the hose from the primary regulator attaches to the secondary regulator on the side, it may be difficult to use the secondary regulator as a handgrip as the position of the hose interferes with the user's hand or forces the user's grip into an unnatural position.

Some paintball markers are capable of impelling in excess of 20 paintballs per second. A common characteristic of paintball markers under rapid and sustained use is that the paintballs impelled towards the end of a sequence leave the paintball marker barrel with less velocity and travel a shorter distance than the balls at the beginning of the sequence. The decline of paintball velocity from the start of a sustained sequence to the end of the sequence decreases accuracy.

In paintball sport competitions, the velocity at which a paintball marker impels a paintball from its barrel is limited to 300 fps or less to protect the participants from harm. A relationship exists between the gas pressure provided to the marker and the speed at which a paintball leaves the barrel. One method used to adjust the muzzle velocity of an exiting paintball is to increase or decrease the air pressure provided by the secondary regulator. Generally, rotating an adjustment screw or knob increases or decreases the gas pressure supplied by the secondary regulator to the paintball marker and subsequently increases or decreases the muzzle velocity of an exiting paintball. The adjustments must be made while operating the paintball marker and while simultaneously measuring the exit velocity of an impelled paintball with a chronograph. The location of the adjustment screw or knob affects the ease of adjusting the gas pressure of the secondary regulator. Adjustment screws or knobs located at the bottom of the secondary regulator may make adjusting the gas pressure, and hence the exit velocity of a paintball, awkward.

Accordingly, there is a need for an air pressure regulator that can maintain a constant muzzle velocity during periods of rapid and sustained use that allows convenient adjustment from the side, that minimizes the negative impact of dirt in the air supply and that acts as a convenient, natural handgrip. The present invention satisfies these needs, as well as others, and overcomes some of the deficiencies in current air driven projectile devices.

BRIEF SUMMARY OF THE INVENTION

The invention overcomes the limitations and problems of the prior art by providing an improved fluid pressure regulator. In one embodiment, the regulator is suitable for use as a regulator for a paintball marker. In another embodiment, the regulator output pressure is adjusted from a side position. In another embodiment, the pressure regulator may be shut off. In another embodiment, the regulator inlet and outlet are placed axially, with respect to each other, to facilitate its connection between the high-pressure source and the device that may require regulated fluid flow. In another embodiment, a high-pressure chamber stores fluid at high pressure to supplement fluid from the high pressure source.

BRIEF DESCRIPTION OF THE SEVERAL VIEWS OF THE DRAWING(S)

A more complete understanding of the present invention may be derived by referring to the detailed description and claims when considered in connection with the Figures, wherein like reference numbers refer to similar elements throughout the Figures, and:

FIG. 7 is a diagram of a cross-sectional view an exemplary larger stem area piston.

FIG. 8 is a diagram of a cross-sectional view an exemplary smaller stem area piston.

FIG. 9 is a diagram of an exemplary adjustment mechanism with adjustment cavity.

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional aspects may not be described in detail herein. Furthermore, the component positions shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely hardware embodiment, or an embodiment combining aspects of both software and hardware.

Figure 1:
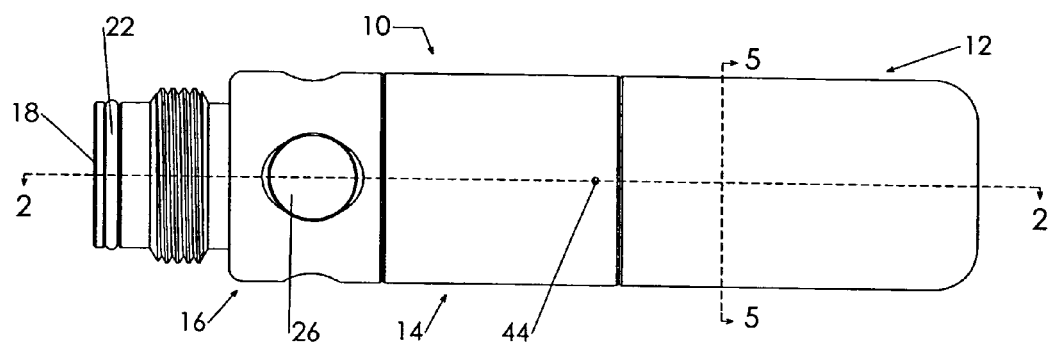
FIG. 1 is a diagram of a side view of an exemplary pneumatic pressure regulator.
Figure 4:
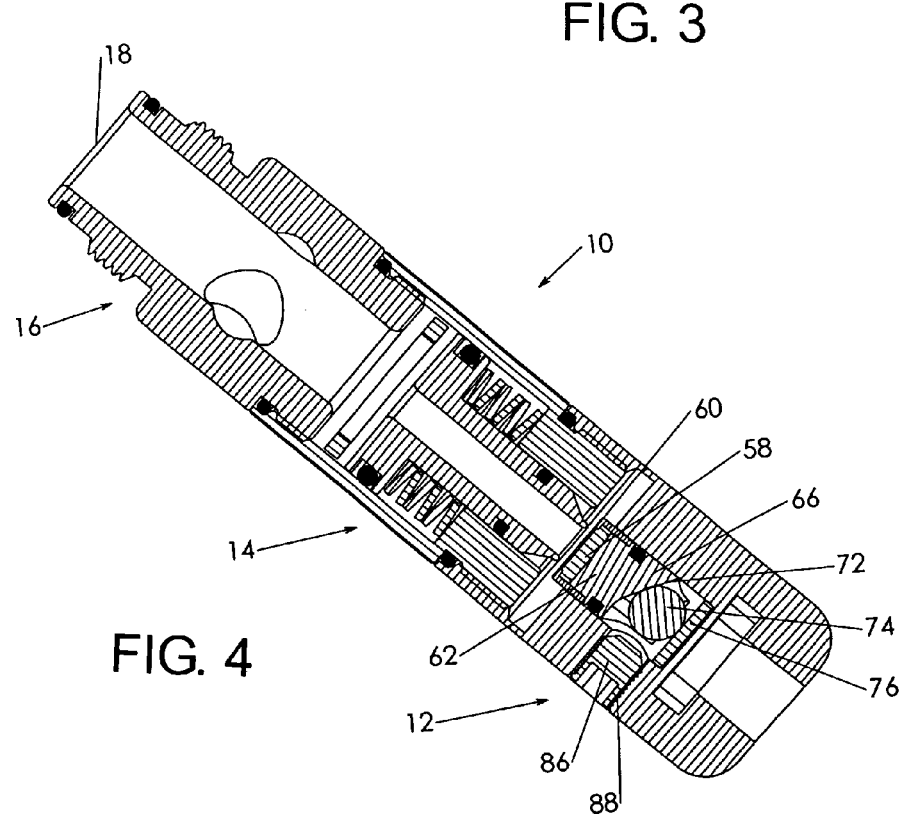
FIG. 4 is a diagram of a perspective cross-sectional view of the exemplary pneumatic pressure regulator of FIG. 2 rotated clockwise by 45 degrees, showing an exemplary larger stem area piston with the regulator in the open position.
Figure 5:
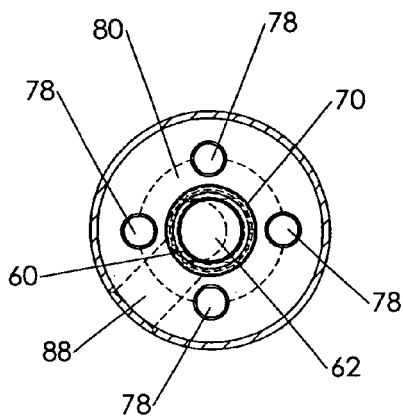
FIG. 5 is a diagram of a cross-sectional view of the exemplary pneumatic pressure regulator of FIG. 1 taken along the lines 5—5 in FIG. 1.

Turning now to FIG. 1, an exemplary regulator body 10 may have three sections: a top section 16, a center section 14 and a base section 12 connected together. Top section 16 may connect to a device that may use regulated fluid pressure, such as, for example, a paintball marker or a pneumatic tool. An o-ring 22 may form a tight seal between top section 16 and the device that may use the regulated fluid. In one embodiment, an axial passage through the top section 16 forms a regulated pressure chamber 20. Fluid from the regulated pressure chamber 20 may pass through an outlet 18 into a device that may use the regulated fluid. In another embodiment, two instrument passages 26 and 32 made angularly to the axial passage in top section 16, may allow instrumentation, such as, for example, a pressure gauge, to monitor the regulated pressure chamber. A piston chamber 36 may be located in an exemplary center section. A piston 38 may be positioned and move axially in the center section with the piston stem passing through a passage in the center section. O-rings 40 and 52 may form a tight seal between the piston and the center section. A bleed hole 44 allows the escape of fluid trapped between o-rings 40 and 52 during assembly. A main spring 42 may be placed between the piston head and the center section. Energy from the main spring may force the piston towards the top section. A secondary spring 34 may be placed between the top section and the piston head. In an exemplary embodiment, the force provided by the secondary spring may be less than the force provided by the main spring. The piston may stop in its movement towards the top section when it compresses the secondary spring and forces it against the top section. The base section 12 may attach to a high-pressure source (not shown) at an inlet 82. The inlet may allow fluid communication between the high-pressure source, a high-pressure chamber 80, bypass passages 78, and a seal chamber 56. The volume represented by the combined volumes of the inlet passage, the high-pressure chamber, the bypass passages, and the seal chamber may be referred to as a high-pressure reserve. The bypass passages may be arranged to circumvent a seal seat cavity 70. The seal seat cavity may open into the seal chamber, but the seal seat cavity may not provide fluid communication with the high-pressure chamber. In one embodiment, the seal seat cavity and inlet are axially located in the base section, the bypass passages are located circumferentially around the seal seat cavity, see FIG. 5, and the outlet is located in-line with the inlet and axially in the top section; thereby allowing a hose from a high-pressure source to enter the regulator body at an end of the body and not through the side of the body. A seal seat 62 may be slidably positioned in the seal seat cavity. A seal end 64 of the seal seat may be configured to seal a piston passage 48. Contact between end of the piston and a seal 58 may stop fluid communication between the seal chamber and the piston passage. In one embodiment, an adjustment end 66 of the seal seat may be shaped to translate the movement of an adjustment sphere 74 into movement of the seal seat. An adjustment rod 86 positioned in an adjustment passage 88 (refer to FIG. 4) may influence the movement of the adjustment sphere. An adjustor floor 76 may provide a hardened surface for the adjustment sphere to push against and may protect the end of the seal seat cavity from gouging. In another embodiment, the adjustment rod may directly contact the adjustment end of the seal seat to translate movement of the adjustment rod into movement of the seal seat.

Figure 2:
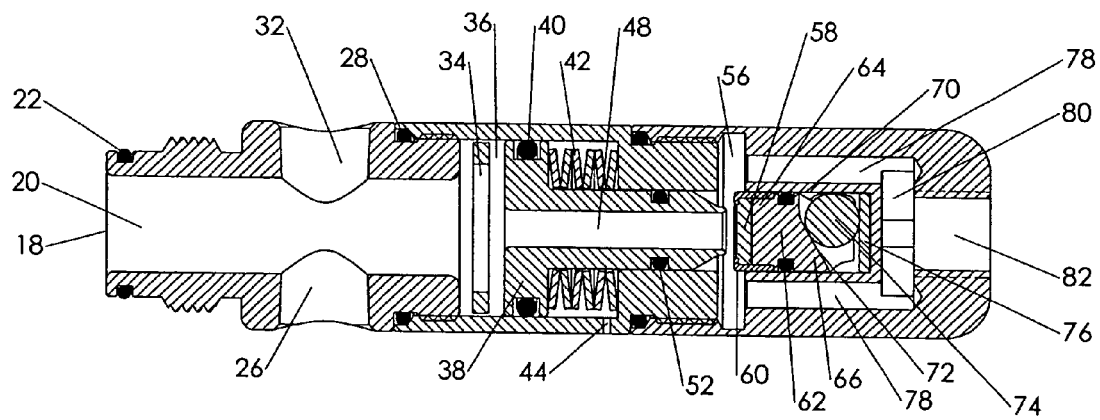
FIG. 2 is a diagram of a cross-sectional view of the exemplary pneumatic pressure regulator of FIG. 1 taken along the line 2—2, showing an exemplary larger stem area piston with the regulator in an open position.
Figure 3:
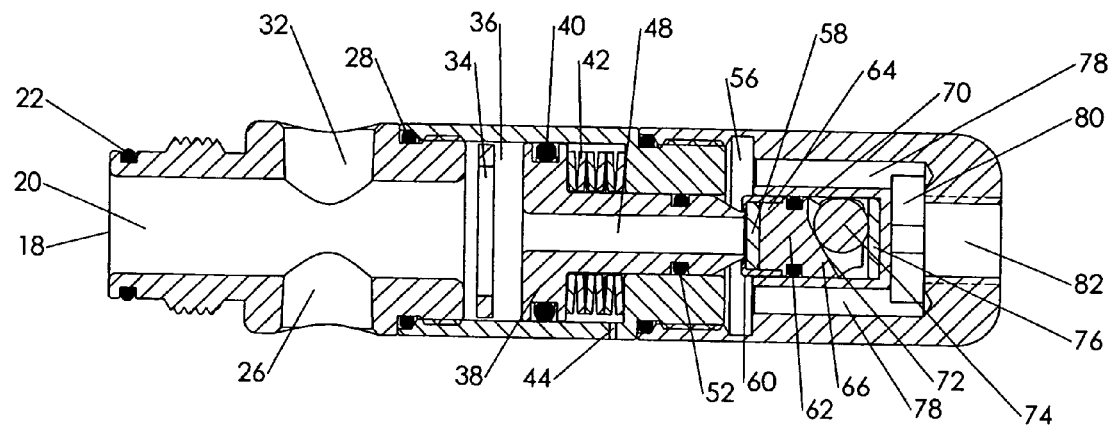
FIG. 3 is a diagram of a cross-sectional view of the exemplary pneumatic pressure regulator of FIG. 1 taken along the line 2—2, showing an exemplary larger stem area piston with the regulator in the closed position.

When the piston is in an open position, as shown in FIG. 2, the piston passage may provide fluid communication between the regulated pressure chamber and the high pressure reserve. In the open position, the seal does not contact the piston or close the piston passage. When the piston is in the closed position, as shown in FIG. 3, the seal may contact the piston stem and may form a tight seal, thereby stopping fluid communication between the regulated pressure chamber and the high-pressure reserve.

Now turning to the adjustment of the regulated fluid pressure. The fluid pressure seen by the device using regulated fluid pressure is the pressure of the fluid in the regulated pressure chamber. The fluid pressure in the regulated pressure chamber may be influenced by at least one of the position of the seal seat, the open or closed position status of the piston, and spring tension. Moving the piston to an open position may allow fluid communication between the regulated pressure chamber and the high-pressure reserve, which may increase the quantity and pressure of the fluid in the regulated pressure chamber. Moving the piston to a closed position may stop fluid communication between the regulated pressure chamber and the high-pressure reserve, which may allow the fluid pressure of the regulated pressure chamber to stabilize and/or decrease. Increasing pressure in the regulated pressure chamber may increase the pneumatic force pressing on the piston head, which in turn presses on the main spring. The pneumatic force on the piston and main spring may move the piston closer to the closed position. Decreasing the pressure in the regulated pressure chamber may decrease the force pressing on the piston head and the main spring and may enable the main spring to move the piston towards the open position. Moving the seal seat closer to the piston may decrease the fluid pressure required in the regulated pressure chamber to move the piston from the open to the closed position. Moving the seal seat away from the piston may increase the fluid pressure required in the regulated pressure chamber to move the piston from the open to the closed position.

There are no limitations on the manner of adjusting the regulated pressure. In one embodiment, the adjustment seat is held in a fixed position and the regulated fluid pressure is determined by the force of the main spring. The regulated pressure may be adjusted by selecting a main spring with a spring constant that provides the desired regulated fluid pressure. In another embodiment, referring to FIG. 4, the force exerted by the main spring may work in cooperation with the position of the seal seat to adjust the desired, regulated pressure. The amount of force exerted by a spring depends on its displacement. For any exemplary spring, increasing the distance between the piston and the seal seat may increase the main spring displacement between the open and closed positions, which in turn may require greater fluid pressure in the regulated pressure chamber and on the piston head before the main spring force is overcome and the piston moved into the closed position. Moving the seal seat closer to the piston may decrease main spring displacement between the open and the closed positions and may decrease the fluid pressure required in the regulated pressure chamber to move the piston into the closed position. In another embodiment, magnetic force may replace and/or augment the force provided by the main spring. There are no limitations on how the position of the seal seat may be adjusted. In one embodiment, Referring to FIG. 4, the adjustment passage is open between the exterior of the base section and the seal seat cavity. The adjustment rod may be located in the adjustment passage and may contact the adjustment sphere (contact not shown for clarity of adjustment mechanism).

The adjustment rod may move the adjustment sphere against the adjustment end of the seal seat, which in turn may move the seal seat closer to the piston. Moving the adjustment rod away from the adjustment sphere may allow the adjustment sphere to move away from the adjustment end of the seal seat, which may allow the seal seat to move away from piston. In one embodiment, the adjustment rod is a screw and the shape of the adjustment end of the seal seat is similar to a ramp having about a 30-degree angle with respect to the adjustor floor. The angle of the ramp may lie between about 10 degrees to about 50 degrees. In another embodiment, the ramp is formed in a groove that may better direct the movement of the adjustment sphere. The shape of the end of the adjustment rod that may contact the adjustment sphere may be selected from the group of flat, concave, convex, pointed, and irregular. In another embodiment, the adjustment passage is perpendicular to the seal seat cavity. In another embodiment, the seal seat is positioned axially to the inlet, the piston, and the outlet. In another embodiment, referring to FIG. 9, an adjustment cavity 94 in the wall of the seal seat cavity opposite the adjustment passage allows the adjustment sphere to move a greater distance towards the end of the adjustment end of the seal seat; thereby providing additional range of adjustment. In another embodiment, the spring constant of the main spring is fixed, the seal seat is in a fixed position and the regulated pressure is set by the length of the piston stem. In another embodiment, the adjustment rod may directly contact the seal seat and modify the position of the seal seat.

Now turning to the operation of an exemplary embodiment of the invention. When an embodiment of the regulator is attached to the paintball marker, just prior to pulling the paintball marker trigger, the regulated pressure chamber may be filled with fluid at the desired pressure and the piston may be in the closed position, as depicted in FIG. 3. Pulling the paintball marker trigger, opens a valve inside the marker that allows the fluid in the regulated pressure chamber to rapidly exhaust through the outlet. The paintball marker then closes its valve; thereby sealing the possibly vacated regulated pressure chamber. When the fluid pressure in the regulated chamber drops, the main spring may force the piston into the open position, as depicted in FIG. 2, which may allow high-pressure fluid to enter the regulated chamber from the high-pressure reserve. In turn, high-pressure fluid may enter the high-pressure reserve through the inlet from the high-pressure source. The influx of high-pressure fluid into the regulated pressure chamber increases fluid pressure in the regulated pressure chamber, which in turn pushes against the piston head. When the fluid pressure in the regulated pressure chamber reaches a predetermined pressure, the piston may be moved into the closed position. Pulling the paintball marker trigger re-starts the regulation sequence.

Figure 6:
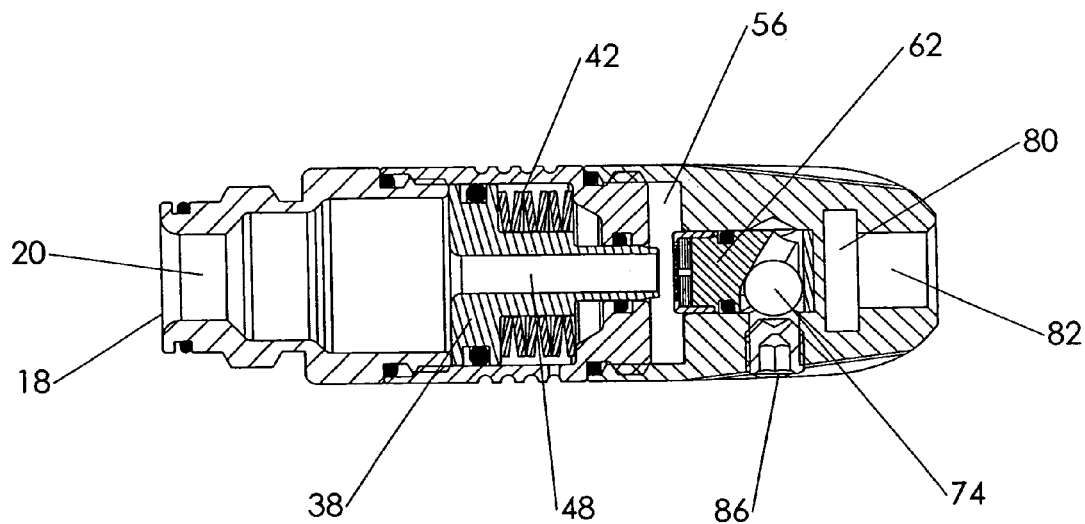
FIG. 6 is a diagram of a cross-sectional view of the exemplary pneumatic pressure regulator of FIG. 1 taken along the line 2—2, showing an exemplary smaller stem area piston with the regulator in an open position.

Now turning to an exemplary piston embodiment. There are no limitations on the size, or shape of the piston. In one embodiment, the piston head is circular. In another embodiment, the piston passage is an axial passage. In another embodiment, referring to FIG. 7, the piston stem outside diameter decreases on a high fluid pressure side 90 of o-ring 52; thereby leaving a relatively large surface area exposed to the high fluid pressure of the seal chamber. Such a piston embodiment may be referred to as a larger stem area piston embodiment. In another embodiment, referring to FIG. 8, the piston stem outside diameter decreases on a lower fluid pressure side 92 of o-ring 52; thereby leaving a relatively small surface area exposed to the high fluid pressure of the seal chamber. Such a piston embodiment may be referred to as a smaller stem area piston embodiment. The piston stem surface area exposed to high fluid pressure may affect regulator performance. For example, in a regulator embodiment using the larger stem area piston embodiment, the pressure of the fluid in the seal chamber pushing against the piston stem may decrease low pressure performance. In one embodiment, six spring washers, each with a load of 283 pounds at deflection, formed the main spring. In the absence of the secondary spring, this embodiment of the regulator would not regulate below 150 psi even though adjusted for lower pressure. Using a wave spring with a load of 6.26 pounds at deflection as the secondary spring enabled this embodiment of the regulator to linearly regulate as low as 20 psi. The force of the secondary spring may have counteracted the force of high-pressure fluid on the piston stem. Another effect of high pressure on the larger stem area piston embodiment is that, for one regulator embodiment, the regulated pressure varied with the input pressure. For example, varying the pressure of the high-pressure source from 500 psi to 1,000 psi caused about a 20 psi increase in the regulated pressure. Another embodiment demonstrates the performance of the smaller stem area piston embodiment, as shown in FIG. 6. This embodiment eliminated the secondary spring. The main spring comprised six spring washers with a load of 283 pounds at defection. This embodiment of the regulator regulated linearly from 0 to 500 psi. No trace of a minimum regulated pressure was detected. Additionally, the regulated pressure was more independent of the input pressure. Varying the pressure of the high-pressure source from 500 psi to 1,000 psi resulted in about a 10 psi increase in the regulated pressure. No effort was made to determine the threshold amount of stem area that resulted in performance improvement without the presence of the secondary spring. In one embodiment of the smaller stem area piston, the inside diameter of the piston (diameter of the piston passage) was about $172/1000$ inches and the outside diameter of the piston stem on the high-pressure side of o-ring 52 is at its largest point about $245/1000$ inches.

Now turning to fluid flow in an exemplary embodiment. Two aspects of an exemplary embodiment may contribute to consistent fluid flow during sustained use. The first aspect that may contribute to consistent, sustained fluid flow may be the diameter of the piston passage and the accumulative diameter of all passages that may be a part of the high-pressure reserve, such as, for example, any opening in the seal chamber, the diameter of each bypass passage, any opening in the high-pressure chamber passage, and the diameter of the inlet. An exemplary embodiment uses a piston passage of diameter sufficient to provide consistent fluid flow during sustained use and the cumulative diameter of passages through the high-pressure reserve may be at least as much as the piston passage diameter. In one embodiment, the piston passage diameter is $172/1000$ inches, and there are six bypass passages each of a diameter of $125/1000$ inches. In another embodiment, the accumulative diameter area of the four bypass passages may be greater than the diameter of the piston passage. In another embodiment, one bypass passage may have a diameter at least as large as the piston passage diameter. A second aspect that may contribute to consistent, sustained fluid flow may be the presence of the high-pressure reserve. The high-pressure reserve may act as a reservoir of high-pressure fluid to reduce the impact of a primary regulator incapable of providing fluid flow sufficient for sustained use. The volume of the high-pressure reserve may be increased by increasing the volume of at least one of the inlet passage, the high-pressure chamber, the bypass passages, and the seal chamber.

The ideal gas law may be used to calculate the relative volume of the regulated pressure chamber to the volume of the high-pressure reserve. The ideal gas law is $PV=nRT$ where P is pressure, V is volume, n is the number of moles of gas, R is the idea gas constant, and T is temperature. The amount of fluid in the regulated pressure chamber relative to the high-pressure reserve may be reflected by the ratio of the product of the pressure and the volume of each chamber. For the calculation, the volume of the piston passage may be added to the volume of the regulated pressure chamber because in the closed position, the piston passage lies in the regulated fluid domain. In one sample calculation, the pressure of the high-pressure source may be 500 psi and the regulated pressure may be 200 psi. In one embodiment, using the above pressures, the ratio of the product of the high-pressure reserve's pressure and volume to the product of the regulated pressure chamber's pressure and volume is about one. The ratio of the volume of the high-pressure reserve to the volume of the regulated pressure chamber is about 0.39. In another embodiment, the ratio of the pressure and volume products for the above pressures is about 1.14. The ratio of the volume of the high-pressure reserve to the volume of the regulated pressure chamber is about 0.45. A ratio of the product of the pressure and volume of about one may allow the high-pressure reserve to once fill the regulated chamber to the regulated pressure without drawing any fluid from the high-pressure source. Alternately, the high-pressure reserve may supply a portion of the fluid required by the regulated chamber each time the high-pressure supply does not supply the entire amount required; thereby allowing the regulator to consistently supply regulated fluid at the desired pressure during a sustain sequence. Increasing the pressure of the high-pressure source may increase the ratio. Decreasing the regulated pressure may also increase the ratio. A regulator with a higher ratio of the product of pressure and volume may better supply fluid at the regulated pressure during a sustained sequence.

An additional aspect of fluid flow in an exemplary embodiment may be the number of seals in the flow path. In an exemplary embodiment, the fluid path from the inlet to the outlet may not force fluid to flow past any seal, except the seal attached to the seal seat. Ideally, fluid does not flow around the outside of the piston stem or head. Channeling fluid flow through large, open passages and past a single seal may decrease the opportunity for foreign objects carried in the fluid, such as, for example, dirt, to get trapped by or to adhere to a surface or seal, thereby interfering with proper operation. In an exemplary embodiment, the only location where the fluid flow passage narrows is where the piston contacts the seal on the seal seat. A seal made of softer material may be better adapted to sealing the piston passage than a seal made of harder material; however, softer material may increase the likelihood of trapping dirt on the seal. The material for the seal in an exemplary embodiment is urethane; however, other suitable seal material may be at least one of neopreme, polyurethane, sorbothane, polytetrafluoroethylene, and similar materials known to the art. In one embodiment, the seal is a disc of urethane having a diameter about equal to the diameter of the seal end of the seal seat. One skilled in the art will appreciate that the seal is not limited to a disk shape.

In one embodiment, the seal may be attached to the seal seat using a retainer ring 60. The retainer ring may fit tightly around the seal end of the seal seat and may have an opening large enough to allow the piston stem to pass through to contact the seal, thereby, stopping fluid flow. Other methods of attaching the seal to the seal seat depend on the type of material and the shape of the seal. In one embodiment, an o-ring may be placed in a groove in the seal seat. In another embodiment, disc shaped seals of various materials may be attached to the seal seat with at least one of a rivet, a screw, and other means of attachment. In another embodiment, an annular seal may be placed in a groove inside the piston passage and the seal end of the seal seat may be conical in shape. The piston passage may be sealed when the conical shape contacts the seal inside the piston passage.

Now turning to shutting off the regulator. In one embodiment, the adjustment mechanism may be used to shut off all fluid flow through the regulator. The piston may be forced into the shut-off position by manipulating the adjustment rod until the seal seat pushing against the piston stem and forces the piston head into contact with the top section. In the shut-off position, the piston may be held immobile and the seal stops all fluid flow through the piston passage. The piston may stay in the shut-off position until the adjustment rod is manipulated such that the seal seat moves away from the piston and the piston away from the top section; thereby, allowing the piston to move in response to changes of fluid pressure in the regulated pressure chamber.

Now turning to exemplary methods of construction and assembly. There are no limitations on how the regulator and/or its component parts are manufactured and/or assembled. In one embodiment, modular manufacture and assembly may be used. In a modular embodiment, multiple sections, for example, a top, a center, and a base may be used. Each section may be manufactured independently of the other sections. Each section may also be manufactured with a variety of characteristics, so that selecting sections with different individual characteristics may result in different regulator characteristics. For example, a top section may have at least one of an instrument passage, threaded connectors, an expanded regulated chamber, an electronic pressure sensor, a pressure release valve, quick-disconnect connectors, a selected color, and selected material. A center section may have at least one of main springs with a higher spring constant, a main spring with a lower spring constant, an electromechanical pressure sensor, an electronic pressure sensor, a secondary spring, a piston with a flat head, a piston with a hemispherical head, a shorter piston stem, a longer piston stem, a smaller piston passage, a larger piston passage, a larger stem area piston, a smaller stem area piston, a piston passage configured for a conical seal, higher volume seal chamber, lower volume seal chamber, threaded connectors, quick-disconnect connectors, a selected color, and selected material. A base section may have at least one of a larger seal seat, a smaller seal seat, a fixed-position seal seat, a harder seal, a softer seal, a conical seal, a spherical seal, an o-ring seal, a seal ring, a seal rivet, a higher volume high-pressure chamber, a smaller volume high-pressure chamber, fewer bypass passages, more bypass passages, higher volume bypass passages, smaller volume bypass passages, a larger inlet, a smaller inlet, a ramp and sphere adjustment mechanism, an adjustment cavity, a threaded adjustment mechanism, threaded connectors, quick-disconnect connectors, an electronic pressure sensor, a pressure release valve, a selected color, and a selected material. Each section, with its selected characteristics, may be manufactured and assembled independently in advance of final selection and assembly of the sections to form a fluid regulator. An exemplary method of assembly may have a uniform connection type between the various sections regardless of the characteristics of the individual sections; thereby allowing sections to interconnect regardless of the characteristics of each section. For example, in one embodiment, any top section may be connected to any center section, and any center section may be connected to any base section. For this embodiment, final assembly of the regulator may be accomplished by connecting a top section, having desired characteristics, to a center section having desired characteristics, and the center section in turn may be connected to a base section having desired characteristics.

Now turning to exemplary materials. There are no limitations on the types of materials that may be used to construct an embodiment of the regulator and/or any embodiment of any component that may be used in a regulator embodiment. One embodiment may use butyl o-rings, a urethane seal, a stainless steel adjustor floor, spring steel in springs, and anodized aluminum. Other embodiments may use at least one of titanium, brass, iron, steel, aluminum, composite materials, and plastic Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. An apparatus configured to facilitate fluid pressure regulation, comprising:

a body having an inlet, an outlet, a regulated pressure chamber, and a high-pressure reserve;

a piston having a piston passage and a smaller stem area, being slidably mounted in said body, said piston biased in an open position and being movable to a closed position in response to increased fluid pressure on said piston;

a seal seat slidably mounted in said body, said seal seat having a seal end configured to seal said piston passage and a shaped adjustment end; and, an adjustment mechanism having a screw, and a sphere, said screw disposable in a passage formed angularly to said body, said sphere in cooperation with said screw and said shaped adjustment end translating displacement of said screw into displacement of said seal seat.

2. The apparatus of claim 1, wherein at least one of said inlet, said outlet, said regulated chamber, said piston passage, and said seal seat is positioned axially to at least one of said inlet, said outlet, said regulated chamber, said piston passage, and said seal seat.

3. The apparatus of claim 1, further comprising an adjustment cavity, wherein a portion of said adjustment sphere may enter said adjustment cavity.

4. The apparatus of claim 1, wherein each of said regulated pressure chamber and said high-pressure reserve is associated with a volume, and wherein the ratio of said volume of said high-pressure reserve to said volume of said regulated pressure chamber is at least about 0.39.

5. The apparatus of claim 1, wherein said regulated pressure chamber and said high-pressure reserve is each associated with a volume and a pressure, and wherein the ratio the product of said volume and said pressure of said high-pressure reserve to said regulated pressure chamber is at least about one.

6. The apparatus of claim 2, wherein each of said regulated pressure chamber and said high-pressure reserve is associated with a volume, and wherein the ratio of said volume of said high-pressure reserve to said volume of said regulated pressure chamber is at least about 0.39.

7. The apparatus of claim 2, wherein said regulated pressure chamber and said high-pressure reserve is each associated with a volume and a pressure, and wherein the ratio the product of said volume and said pressure of said high-pressure reserve to said regulated pressure chamber is at least about one.

8. An apparatus configured to facilitate fluid pressure regulation, comprising:
a body having an inlet, an outlet, a regulated pressure chamber, and a high-pressure reserve;
means for regulating fluid pressure at said outlet including a piston having a piston passage and a smaller stem area, being slidably mounted in said body, said piston biased in an open position and being movable to a closed position in response to increased fluid pressure on said piston;
means for sealing said piston passage including a seal seat slidably mounted in said body and configured to seal said piston passage;
means for an adjustment mechanism configured for adjusting fluid pressure at said outlet, said adjustment mechanism comprising an adjustment rod and a sphere, said adjustment rod disposed in a bore formed angularly to said body, said sphere in cooperation with said adjustment rod and said seal seat translates displacement of said adjustment rod into displacement of said seal seat.

9. The apparatus of claim 8, wherein said adjustment rod comprises a screw.

10. An apparatus configured to facilitate fluid pressure regulation, comprising:
a movable piston having a piston passage therethrough
a base section having an inlet and a high-pressure reserve;
a seal seat slidably mounted in said base section, said seal seat having a seal end configured to seal the piston passage and an adjustment end;
a sphere interfacing with said adjustment end; and,
an adjustment rod disposed in a passage formed in said base section, said sphere in cooperation with said adjustment rod and said adjustment end translates displacement of said adjustment rod into displacement of said seal seat.

11. The apparatus of claim 10, wherein the direction of displacement of said adjustment rod is approximately orthogonal to the direction of displacement of said seal seat.

12. The apparatus of claim 10, wherein the direction of displacement of said adjustment rod relative to the direction of displacement of said seal seat is greater than 0 degrees and less than 180 degrees.

13. The apparatus of claim 10, wherein said adjustment rod comprises a screw.

14. A method for facilitating the assembly of a fluid regulator, said method comprising:
selecting a top section having an outlet;
selecting a center section having a piston, a piston passage and a smaller stem area, said piston biased in an open position and movable to a closed position in response to increased fluid pressure on said piston;
selecting a base section having an inlet, a seal seat, a high-pressure chamber, and an adjustment mechanism, said seal seat configured to seal said piston passage, said adjustment mechanism configured to adjust fluid pressure at said outlet, said adjustment mechanism comprising an adjustment rod and a sphere, said sphere interfacing with said seal seat, said adjustment rod interfacing with said sphere, wherein said sphere in cooperation with said adjustment rod and said seal seat translates displacement of said adjustment rod into displacement of said seal seat;
connecting said top section to said center section; and,
connecting said center section to said base section.

15. The method of claim 14, wherein said outlet is configured to connect to a paintball marker and said inlet is configured to connect to a high-pressure source.

16. The method of claim 14, wherein said adjustment rod comprises a screw.

17. An apparatus configured to facilitate fluid pressure regulation, comprising:
a top section having an outlet;
a center section having a piston with an axial passage open at both ends and slidably mounted in said center section, said piston biased in an open position and being movable to a closed position in response to increased gas pressure on said piston, said center section interfacing with said top section;
a base section having an inlet, said base section interfacing with said center section;
a seal seat slidably mounted in said base section and adapted to directly seal one end of said axial passage when said piston is in said closed position, said seal seat moving primarily axially.

18. The apparatus of claim 17, additionally comprising an adjustment rod and a sphere adapted to adjust fluid pressure at said outlet, wherein said sphere in cooperation with said adjustment rod and said seal seat translates displacement of said adjustment rod into axial displacement of said seal seat.

* * * * *